United States Patent Office 3,646,051
Patented Feb. 29, 1972

3,646,051
PROCESS FOR THE RESOLUTION OF A SUBSTITUTED IMIDAZOTHIAZOLE
François Dewilde, Saint-Marc-Massy, and Guy Gabriel Frot, Noisy-la-Sec, France, assignors to Rhone-Poulenc S.A., Paris, France
No Drawing. Filed Apr. 14, 1970, Ser. No. 28,513
Claims priority, application France, Apr. 24, 1969, 6913030
Int. Cl. C07d 99/06
U.S. Cl. 260—306.7
6 Claims

ABSTRACT OF THE DISCLOSURE

Laevorotatory 6 - phenyl - 2,3,5,6 - tetrahydroimidazo[2,1-b]thiazole, useful as an anthelmintic, is isolated from a mixture of its hydrochloride with the hydrochloride of the racemic hydrochloride by fractional solution in water.

This invention relates to the separation of the laevorotatory isomer of 6-phenyl-2,3,5,6-tetrahydroimidazo-[2,1-b]thiazole of the formula:

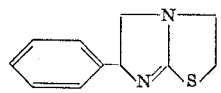

from mixtures of its optical isomers.

Racemic 6-phenyl - 2,3,5,6 - tetrahydroimidazo[2,1-b] thiazole, principally in the form of the free base or the hydrochloride has already been used as an anthelmintic agent. However, it is known that it is the laevorotatory isomer which is responsible for the anthelmintic activity of the racemic mixture, the dextrorotatory isomer being practically ineffective as an anthelmintic agent and furthermore toxic. Therefore it is desirable to have available the pure laevorotatory isomer.

Processes are already known for the separation of the laevorotatory isomer by separation, for example by fractional crystallisation or fractional solution, of pure optically active isomeric salts of organic acids having an asymmetric carbon atom, for example 10-camphorsulphonic acid or a derivative of glutamic acid, with the racemic base 6-phenyl-2,3,5,6-tetrahydro-imidazo[2,1-b] thiazole. In each case, in order to obtain laevorotatory isomers of satisfactory optical purity without having to carry out an excessive number of fractional crystallisations or fractional solutions, it is necessary to ascertain the most favourable solvent media and temperature range. Since it is not possible to forecast these conditions for each new active acid used, this must be done by trial and error and the determination of these conditions is frequently laborious as a consequence.

It has now unexpectedly been found that the hydrochloride of the laevorotatory isomer of 6-phenyl-2,3,5,6-tetrahydro-imidazo[2,1-b]thiazole can be separated from the racemic hydrochloride by fractional solution in an aqueous medium. Thus it is possible to obtain the laevorotatory hydrochloride from a mixture of the hydrochlorides of the optical isomers of 6-phenyl-2,3,5,6-tetrahydroimidazo[2,1-b]thiazole containing a preponderance of the laevorotatory isomer, which is easily obtained from a corresponding mixture of the salts of the isomers with an optically active acid. This mixture can in turn be obtained by using any pure optically active acid even under conditions not favourable for perfect separation of its salt with the laevorotatory isomer of 6-phenyl-2,3,5,6-tetrahydro-imidazo[2,1-b]thiazole. The invention provides a process for separating the hydrochloride of the laevorotatory isomer of 6-phenyl-2,3,5,6-tetrahydro-imidazo-[2,1-b]thiazole from a mixture of the hydrochlorides of the optical isomers containing a preponderance of the laevorotatory isomer, which process comprises isolating the laevorotatory hydrochloride from the racemic hydrochloride by fractional solution in an aqueous medium.

l-di-(p-toluyl)tartaric acid is an example of an acid which can be used as the optically pure organic acid. Fractional precipitation of the salt of this acid with racemic 6 - phenyl - 2,3,5,6-tetrahydro-imidazo[2,1-b]thiazole from a mixture of water and methanol provides a precipitate enriched in the salt of the laevorotatory base. Precipitation is facilitated by the addition of water (300 to 500 ml. of water per litre of methanol) or by cooling (for example from 50° to 0° C. in stages).

The obtained 1-di-(p-toluyl)tartrate of the base, enriched in the salt of the laevorotatory base, is converted to the corresponding hydrochloride by known methods (for example, rendering alkaline with ammonia a solution of the base in methylene chloride and then precipitating the hydrochloride of the base by bubbling in dry gaseous hydrogen chloride).

The hydrochloride of the laevorotatory base is separated from the hydrochloride of the racemic base by fractional solution, preferably in water. It is convenient to use about 50 to 100 g. of water per 100 g. of hydrochloride to be treated, and the process is favourably carried out at a temperature from 0° to 15° C. As the laevorotatory hydrochloride is more soluble in water than the racemic hydrochloride, it follows that the greater the proportion of laevorotatory hydrochloride in the initial mixture, the more critical the amount of water becomes.

If required, further purification of the hydrochloride of the laevorotatory base may be undertaken, for example, by dissolution in water followed by precipitation from solution by addition of a water-miscible non-solvent for the hydrochloride such as acetone. Chemical impurities, as distinct from optical impurities, may be removed in this manner.

The optically pure free laevorotatory base may, if desired, be regenerated from the hydrochloride by conventional means.

The example which follows illustrates the invention.

EXAMPLE

6 - phenyl - 2,3,5,6 - tetrahydro-imidazo[2,1-b]thiazole hydrochloride (77 g.) enriched to a total of 66.7% of laevorotatory isomer (representing 0.320 mol of total base, of which 66.6% is the racemic isomer and 33.4% is free laevorotatory isomer) and water (50 ml.) at 7° C. are successively introduced into a container provided with a mechanical stirrer. The mixture is stirred for one hour at this temperature and the solid is then filtered off, suction-dried and washed 4 times with methylene chloride (15 ml. each portion).

6-phenyl-2,3,5,6-tetrahydro-imidazo[2,1-b]thiazole hydrochloride (50 g.), containing the equivalent of 95% of the racemic isomer, remains on the filter. Concentration of the filtrate to dryness yields the hydrochloride of the laevorotatory base (24 g.) having a specific optical rotation $[\alpha]_D^{25} = -118°$ (measured in aqueous solution at a concentration of 5 g./100 ml. of solution).

A fresh treatment with water provides the hydrochloride of the optically pure laevorotatory base. The laevorotatory hydrochloride, $[\alpha]_D^{25} = -118°$, obtained as described above (22.8 g.) and water (18.8 g.) at 7° C. are introduced into a container equipped with a mechanical stirrer. After stirring for one hour at 7° C., the solid material is filtered off and suction-dried; 1.5 g. of the undissolved hydrochloride of 6-phenyl-2,3,5,6-tetrahydro-imidazo[2,1-b]thiazole, containing 83% of racemic product, remain on the filter. The filtrate is concentrated so as to bring its water content to 18.5% by weight based on the total weight of the solution. The laevorotatory hydrochloride is then precipitated by adding 24 volumes of acetone per volume of residual water. After filtering at −5° C. and drying, laevorotatory 6-phenyl-2,3,5,6-tetrahydro-imidazo[2,1-b]thiazole hydrochloride (20.2 g.) $[\alpha]_D^{25} = -125°$ (measured in aqueous solution, concentration 5 g./100 ml. of solution) is obtained. The yield of laevorotatory hydrochloride so obtained is 83% relative to the free laevorotatory hydrochloride present in the original mixture.

The original hydrochloride enriched with laevorotatory base is prepared as follows:

1-di-(p-toluyl)tartaric acid (289 g.; 0.75 mol) is dissolved in methanol (4,400 ml.), and racemic 6-phenyl-2,3,5,6-tetrahydro-imidazo[2,1-b]thiazole (153 g.; 0.75 mol) is added in the course of 15 minutes with stirring. The resulting methanolic solution is maintained at 35° C. while 1740 g. of water are then added over a period of 30 minutes. The resulting clear solution is then cooled to 31° C. during the course of 50 minutes; a precipitate is formed. After standing at 31° C. for 1 hour, the reaction mixture is filtered at this temperature. The acid 1-di-(p-toluyl)tartrate of 6-phenyl-2,3,5,6-tetrahydro-imidazo[2,1-b]thiazole (174 g.), containing 68% of laevorotatory isomer, and having a specific optical rotation $[\alpha]_D^{25} = -112°$ measured in methanolic solution at a concentration of 5 g./100 ml. of solution, remains on the filter.

Cooling of the filtrate first to 20° C. and then to 0° C. yields two successive precipitates; but the content of laevorotatory isomer of these is less, the overall content of the two being 60.5% of laevorotatory isomer for a total weight of 141 g.

The entire enriched salt is dissolved by heating in a mixture of water and methanol containing 400 ml. of water and 1000 ml. of methanol per 100 g. of salt, and is then reprecipitated by cooling in a similar manner to that described above, yielding the acid 1-di-(p-toluyl) tartrate of 6-phenyl-2,3,5,6-tetrahydro-imidazo[2,1-b]thiazole (200 g.), containing 71.3% of the laevorotatory isomer overall.

This salt is converted into the hydrochloride by rendering alkaline, extracting and then acidifying with hydrochloric acid in the following manner: The acid 1-di-(p-toluyl)tartrate (200 g.) is introduced into a medium consisting of water (1300 g.) and methylene chloride (650 ml.) and 22 Bé. (10.8 N) ammonia solution (75 ml.) is added in the course of 10 minutes at 20° C. with thorough stirring.

The mixture is left to stand, the lower organic phase is decanted, the upper aqueous layer is extracted with methylene chloride (500 ml.), and the organic layers are combined and washed with water (500 ml.). The aqueous layer is decanted and the organic layer is filtered through active charcoal (CECA 50 S charcoal); dry hydrogen chloride is then bubbled through the methylene chloride solution with stirring, while the temperature is kept at about 10° C., until the pH value reaches 2.5–3.

The precipitated hydrochloride is filtered off and then washed twice with methylene chloride (100 ml.). The hydrochloride of 6-phenyl-2,3,5,6-tetrahydro-imidazo-[2,1-b]thiazole (77 g.) containing 66.7% of laevorotatory isomer and having a specific optical rotation $[\alpha]_D^{25} = -42.5°$ (measured in aqueous solution at a concentration of 5 g./100 ml. of solution), is thus obtained.

We claim:

1. Process for separating the hydrochloride of the laevorotatory isomer of 6-phenyl-2,3,4,5,6-tetrahydroimidazo-[2,1-b]-thiazole from a mixture of the said hydrochloride with the hydrochloride of racemic 6-phenyl-2,3,4,5,6-tetrahydroimidazo[2,1-b]-thiazole, which process comprises contacting the said mixture with a medium consisting essentially of water to fractionally dissolve the said hydrochloride of the laevorotatory isomer.

2. Process according to claim 1 wherein 50 to 100 grams of water are used per 100 grams of the mixture of hydrochloride.

3. Process according to claim 1 wherein the temperature is 0° to 15° C.

4. Process according to claim 1 wherein the said hydrochloride mixture is obtained by fractional precipitation from a solution of the salt of the racemic base with an optically active acid in a mixture of methanol and water, isolating a mixture of the salt of the optically active acid with the laevorotatory isomer of 6-phenyl-2,3,5,6-tetrahydroimidazo[2,1-b]thiazole and the salt of the said acid with racemic 6-phenyl-2,3,5,6-tetrahydroimidazo-[2,1-b]thiazole and converting this mixture to a mixture of the corresponding hydrochlorides.

5. Process according to claim 4 wherein the optically active acid is 1-di-(p-toluyl)tartaric acid.

6. Process according to claim 1 wherein the laevorotatory hydrochloride obtained is further purified by recrystallisation from an aqueous solution.

References Cited

UNITED STATES PATENTS 3,478,047   11/1969   Doyle et al. _____ 260—306.7

ALEX MAZEL, Primary Examiner

R. J. GALLAGHER, Assistant Examiner